United States Patent
Guerrant

(12) 
(10) Patent No.: US 6,921,007 B1
(45) Date of Patent: Jul. 26, 2005

(54) HITCH-MOUNTED GAME CARRIER APPARATUS

(76) Inventor: Jerry E. Guerrant, 515 Hicksboro Rd., Henderson, NC (US) 27537

( * ) Notice: Subject to any disclaimer, the term of this patent is extended or adjusted under 35 U.S.C. 154(b) by 184 days.

(21) Appl. No.: 10/360,277

(22) Filed: Feb. 10, 2003

(51) Int. Cl.[7] .............................................. B60R 11/00
(52) U.S. Cl. ....................... 224/519; 224/521; 224/525; 224/528; 224/533; 414/462; 452/192
(58) Field of Search .......................... 224/521–22, 519, 224/524–25, 528, 533, 310; 414/462; 452/187, 452/192

(56) References Cited

U.S. PATENT DOCUMENTS

| | | | |
|---|---|---|---|
| 4,806,063 A * | 2/1989 | York | ........................... 414/462 |
| 5,211,601 A * | 5/1993 | Cope | ........................... 452/187 |
| 5,791,858 A | 8/1998 | Sasser | |
| 6,089,431 A | 7/2000 | Heyworth | |
| D429,051 S | 8/2000 | Porter | |
| 6,095,349 A | 8/2000 | O'Meara | |
| 6,138,991 A * | 10/2000 | Myers, Jr. | .................... 254/323 |
| 6,152,675 A | 11/2000 | Compton | |
| 6,250,483 B1 | 6/2001 | Frommer | |
| 6,599,078 B1 * | 7/2003 | Elder | .......................... 414/542 |
| 6,705,821 B2 * | 3/2004 | Philipps et al. | .............. 414/462 |

* cited by examiner

*Primary Examiner*—Stephen K. Cronin

(57) ABSTRACT

A hitch-mounted game carrier apparatus for transporting and skinning game. The hitch-mounted game carrier apparatus includes a support assembly being adapted to be fastened to a hitch of a vehicle; and also includes a winch assembly being mounted to the support assembly and including a winch and a cable being carried by the winch; and further includes a game carrier assembly being supported by the support assembly for carrying the game.

7 Claims, 3 Drawing Sheets

US 6,921,007 B1

HITCH-MOUNTED GAME CARRIER APPARATUS

BACKGROUND OF THE INVENTION

1. Field of the Invention

The present invention relates to vehicle-mounted game carriers and more particularly pertains to a new hitch-mounted game carrier apparatus for transporting and skinning game.

2. Description of the Prior Art

The use of vehicle-mounted game carriers is known in the prior art. More specifically, vehicle-mounted game carriers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 6,095,349; U.S. Pat. No. 6,250,483; U.S. Pat. No. 6,152,75; U.S. Pat. No. 6,089,431; U.S. Pat. No. 5,791,858; and U.S. Pat. No. Des. 429,051.

While these devices fulfill their respective, particular objectives and requirements, the aforementioned patents do not disclose a new hitch-mounted game carrier apparatus. The prior art includes frames mounted to hitches of vehicles and also includes winches and cables used to suspend the game off the ground and from the vehicles.

SUMMARY OF THE INVENTION

The general purpose of the present invention, which will be described subsequently in greater detail, is to provide a new hitch-mounted game carrier apparatus which has many of the advantages of the vehicle-mounted game carriers mentioned heretofore and many novel features that result in a new hitch-mounted game carrier apparatus which is not anticipated, rendered obvious, suggested, or even implied by any of the prior art vehicle-mounted game carriers, either alone or in any combination thereof. The present invention includes a support assembly being adapted to be fastened to a hitch of a vehicle; and also includes a winch assembly being mounted to the support assembly and including a winch and a cable being carried by the winch; and further includes a game carrier assembly being supported by the support assembly for carrying the game. None of the prior art includes the combination of the elements of the present invention.

There has thus been outlined, rather broadly, the more important features of the hitch-mounted game carrier apparatus in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new hitch-mounted game carrier apparatus which has many of the advantages of the vehicle-mounted game carriers mentioned heretofore and many novel features that result in a new hitch-mounted game carrier apparatus which is not anticipated, rendered obvious, suggested, or even implied by any of the prior art vehicle-mounted game carriers, either alone or in any combination thereof.

Still another object of the present invention is to provide a new hitch-mounted game carrier apparatus for transporting and skinning game.

Still yet another object of the present invention is to provide a new hitch-mounted game carrier apparatus that is easy and convenient to set up and use.

Even still another object of the present invention is to provide a new hitch-mounted game carrier apparatus that allows a user to easily load one's game for the transporting thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
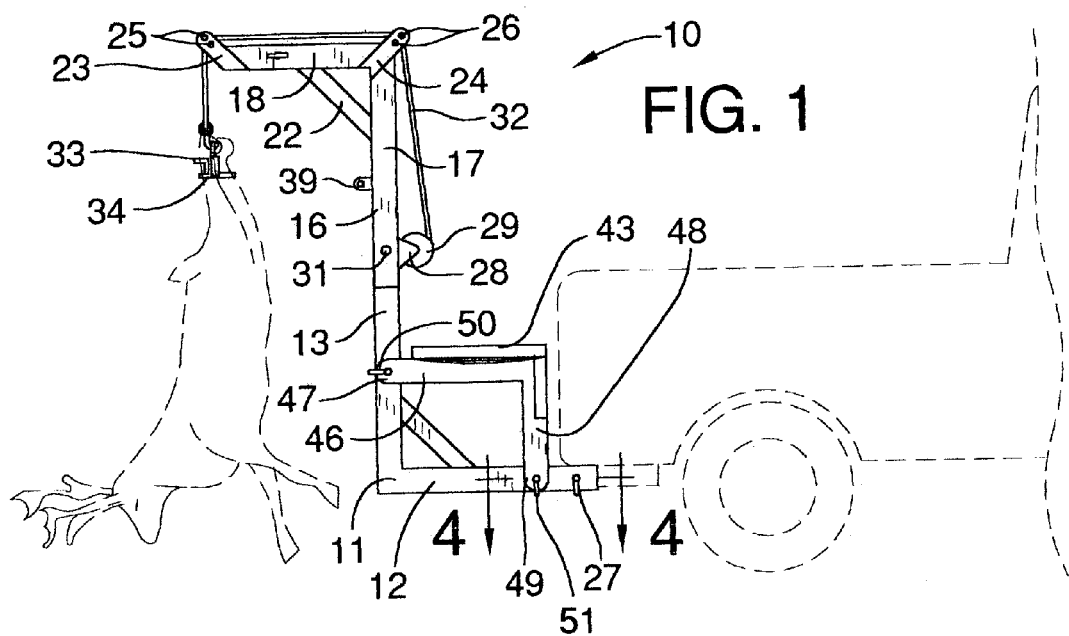
FIG. 1 is a side elevational view of a new hitch-mounted game carrier apparatus according to the present invention.
Figure 2:
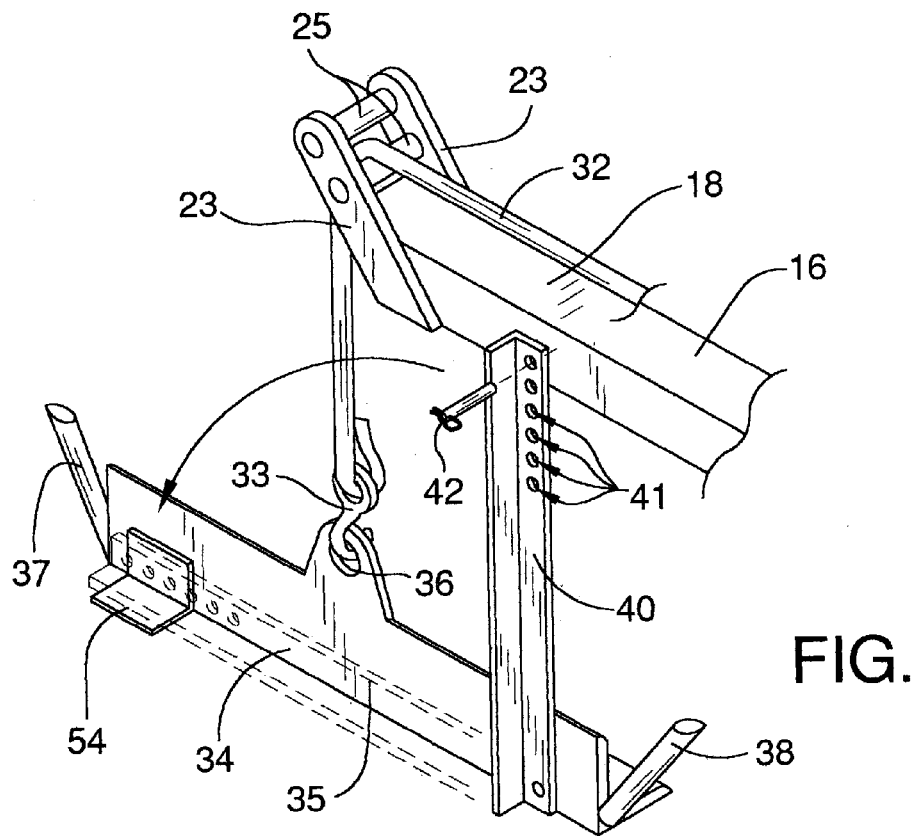
FIG. 2 is a partial perspective view of the present invention.
Figure 3:
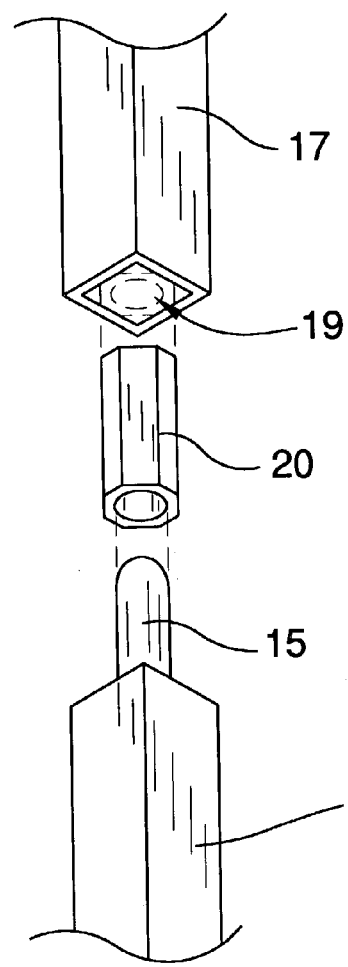
FIG. 3 is a partial detailed exploded view of the present invention.
Figure 4:
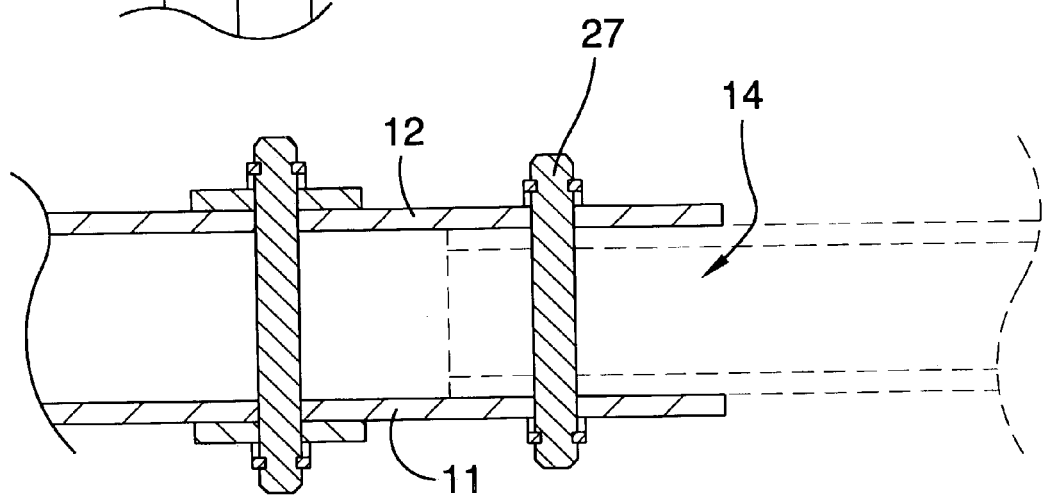
FIG. 4 is a partial cross-sectional view of the present invention.
Figure 5:
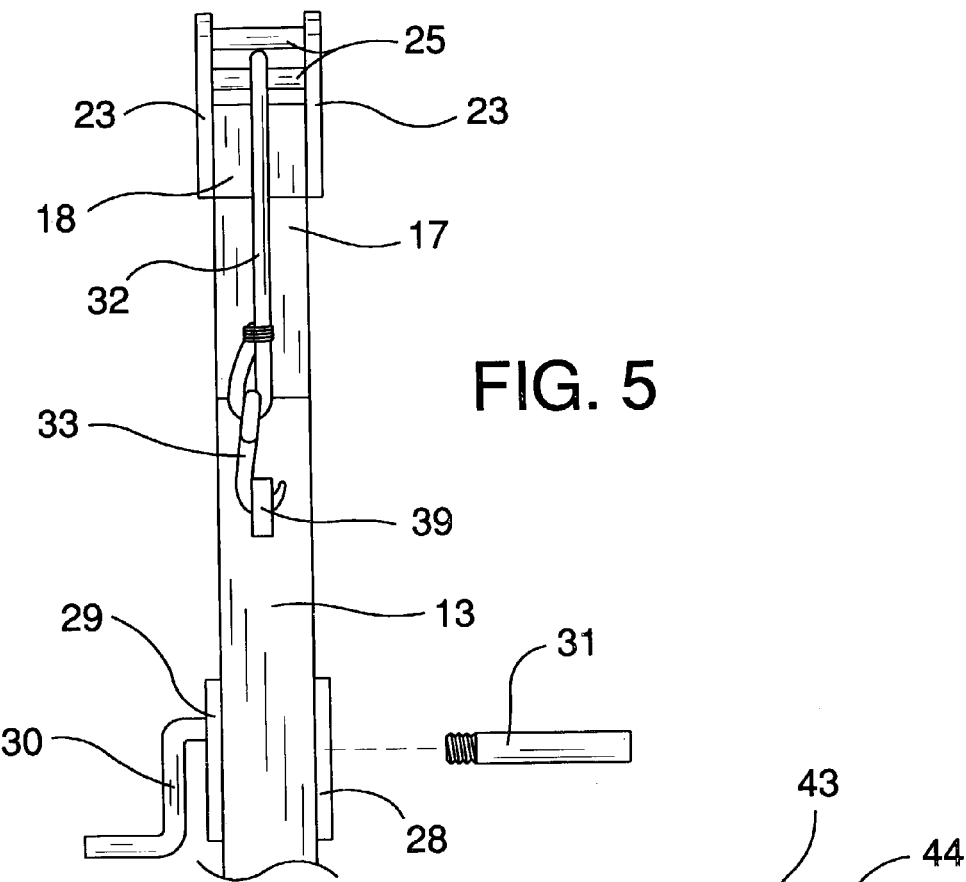
FIG. 5 is a partial front elevational view of the present invention.
Figure 6:
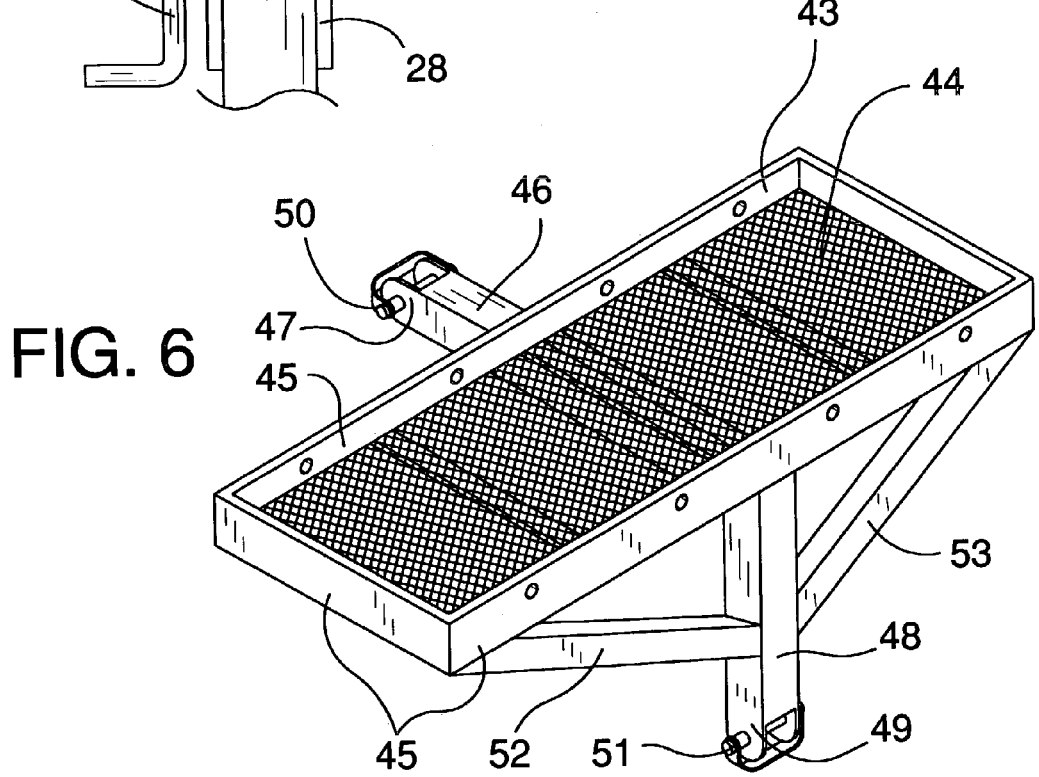
FIG. 6 is a perspective view of a basket assembly of the present invention.

With reference now to the drawings, and in particular to FIGS. 1 through 6 thereof, a new hitch-mounted game carrier apparatus embodying the principles and concepts of the present invention and generally designated by the reference numeral 10 will be described.

As best illustrated in FIGS. 1 through 6, the hitch-mounted game carrier apparatus 10 generally comprises a support assembly being adapted to be fastened to a hitch of a vehicle. The support assembly includes a first tubular support member 11 being fastenable with a first fastener 27 to the hitch, and also includes a second tubular support member 16 being detachably mounted to the first tubular support member 11, and further includes braces 21,22 for stabilizing the first and second tubular members 11,16, and also includes cable support members 23–26 being securely attached to the second tubular support member 16. The first tubular support member 11 includes a first elongate portion 12 having an open end 14 which is adapted to fastenably receive a portion of the hitch, and also includes a second elongate portion 13 being angled approximately 90 degrees to the first elongate portion 12 and being adapted to extend upwardly relative to the hitch, and further includes a stub shaft 15 extending outwardly from an end of the second elongate portion 13. The second tubular support member 16 includes a first elongate portion 17 being removably mounted upon the second elongate portion 13 of the first tubular support member 11, and also includes a second elongate portion 18 being angled approximately 90 degrees to the first elongate portion 17 of the second tubular support member 16. The cable support members 23–26 includes pairs of brackets 23,24 being securely attached at ends of the second elongate portion 18 of the second tubular support member 16, and also includes pairs of guide pins 25,26 being securely attached to the pairs of the brackets 23,24 with the guide pins 25,26 of the pairs of the guide pins being spaced apart. The support assembly further includes a bushing 20 being removably and securely disposed in an open end 19 of the first elongate portion 17 of the second tubular support member 16 and being movably disposed about the stub shaft 15.

A winch assembly is securely mounted to the support assembly and includes a winch 28 and a cable 32 being carried by the winch 28. The winch assembly further includes a handle 30 being detachably attached with a fastening pin 31 to a spindle 29 of the winch 28 for taking up the cable 32 about the spindle 29 with the cable 32 being movably disposed between the guide pins 25,26 of each pair of the guide pins 25,26.

A game carrier assembly is supported by the support assembly for carrying the game. The game carrier assembly includes a hook 33 being securely attached to an end of the cable 32, and also includes a hanger 34 being detachably connected to the hook 33, and further includes spears 37,38 being securely attached to the hanger 34 and extending outwardly therefrom for engaging and supporting the game, and also includes a hook retainer member 39 being securely attached to the first tubular support member 11 for storing the hook 33. The hanger 34 includes a laterally-angled elongate member 35 and also includes an eyelet 36 being integrally disposed along a longitudinal edge of the laterally-angled elongate member 35 with the hook 33 being removably secured to the eyelet 36. The game carrier assembly further includes a laterally-angled brace 40 being pivotally attached to the hanger 34 and having a plurality of holes 41 being spacedly disposed along and through an end portion thereof with the laterally-angled brace 40 being removably supported upon an angled brace support member 54 which is securely attached to the hanger 34, and also includes a fastening member 42 being removably disposed in a selected one of the holes 41 of the laterally-angled brace 40 and in the second elongate portion 18 of the second tubular support member 16. The game carrier assembly further includes a basket 43 having a mesh support wall 44 and also having side walls 45 being securely disposed along a perimeter of the mesh support wall 44, and also includes bracket members 46,48 being securely attached to the basket 43 and being fastenable to the second elongate portion 13 of the first tubular support member 11 and also being fastenable to the first elongate portion 12 of the first tubular support member 11, and further includes brace members 52,53 being securely attached to the basket 43 and to one of the bracket members 48. The bracket members 46,48 have clevis-shaped end portions 47,49 with locking pins 50,51 being removably disposed therethrough and through the first tubular support member 11 for securely mounting the basket 43 to the first tubular support member 11.

In use, the user unwinds the cable 42 from the spindle 29 of the winch 28 to lower the hanger 34 to the ground, and the user places the game upon the spears 37,38, and raises the game off the ground and suspends the game from the second tubular support member 16 by rotating the handle 30 to take up the cable 32 about the spindle 29. To prevent the game from swinging about, the user fastens the laterally-angled brace 40 to the second tubular support member 16 using the fastening member 42. Once finished, the user can unhook the hanger 34, and attach the hook 33 to the hook retainer member 39.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the hitch-mounted game carrier apparatus. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hitch-mounted game carrier apparatus comprising:
a support assembly being adapted to be fastened to a hitch of a vehicle, said support assembly including a first tubular support member being fastenable with a first fastener to the hitch, and also includes a second tubular support member being detachably mounted to said first tubular support member, and further including braces for stabilizing said first and second tubular members, and also includes cable support members being attached to said second tubular support member, said first tubular support member including a first elongate portion having an open end which is adapted to fastenably receive a portion of the hitch, and also including a second elongate portion being angled approximately 90 degrees to said first elongate portion and being adapted to extend upwardly relative to the hitch, and further including a stub shaft extending outwardly from an end of said second elongate portion, said second tubular support member including a first elongate portion being removably mounted upon said second elongate portion of said first tubular support member, and also including a second elongate portion being angled approximately 90 degrees to said first elongate portion of said second tubular support member, said cable support members including pairs of brackets being attached at ends of said second elongate portion of said second tubular support member, and also including pairs of guide pins being attached to said pairs of said brackets, said guide pins of said pairs of said guide pins being spaced apart, said support assembly further including a bushing being disposed in an open end of said first elongate portion of said second tubular support member and being movably disposed about said stub shaft;

a winch assembly being mounted to said support assembly and including a winch and a cable being carried by said winch;

a game carrier assembly being supported by said support assembly for carrying the game.

2. The hitch-mounted game carrier apparatus as described in claim 1, wherein said winch assembly further includes a handle being detachably attached with a fastening pin to a spindle of said winch for taking up said cable about said spindle, said cable being movably disposed between said guide pins of each said pairs of said guide pins.

3. The hitch-mounted game carrier apparatus as described in claim 2, wherein said game carrier assembly includes a hook being attached to an end of said cable, and also includes a hanger being detachably connected to said hook, and further includes spears being attached to said hanger and extending outwardly therefrom for engaging and supporting the game, and also includes a hook retainer member being attached to said first tubular support member for storing said hook.

4. The hitch-mounted game carrier apparatus as described in claim 3, wherein said hanger includes a laterally-angled elongate member and also includes an eyelet being disposed along a longitudinal edge of said laterally-angled elongate member, said hook being removably secured to said eyelet.

5. The hitch-mounted game carrier apparatus as described in claim 4, wherein said game carrier assembly further includes a laterally-angled brace being pivotally attached to said hanger and having a plurality of holes being spacedly disposed along and through an end portion thereof, and also includes a fastening member being removably disposed in a selected one of said holes of said laterally-angled brace and in said second elongate portion of said second tubular support member.

6. The hitch-mounted game carrier apparatus as described in claim 5, wherein said game carrier assembly further includes a basket having a mesh support wall and also having side walls being disposed along a perimeter of said mesh support wall, and also includes bracket members being attached to said basket and being fastenable to said second elongate portion of said first tubular support member and also being fastenable to said first elongate portion of said first tubular support member, and further includes brace members being attached to said basket and to one of said bracket members.

7. The hitch-mounted game carrier apparatus as described in claim 6, wherein said bracket members have clevis-shaped end portions with locking pins being removably disposed therethrough and through said first tubular support member for securely mounting said basket to said first tubular support member.

* * * * *